United States Patent
Hagihara

(10) Patent No.: US 7,433,758 B2
(45) Date of Patent: Oct. 7, 2008

(54) CONTROL APPARATUS OF ROBOT

(75) Inventor: Jun Hagihara, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 318 days.

(21) Appl. No.: 10/584,281

(22) PCT Filed: Dec. 16, 2004

(86) PCT No.: PCT/JP2004/018821

§ 371 (c)(1),
(2), (4) Date: Jun. 26, 2006

(87) PCT Pub. No.: WO2005/063455

PCT Pub. Date: Jul. 14, 2005

(65) Prior Publication Data

US 2007/0164695 A1   Jul. 19, 2007

(30) Foreign Application Priority Data

Dec. 26, 2003   (JP)   ............................ 2003-432213

(51) Int. Cl.
*G06F 19/00*   (2006.01)

(52) U.S. Cl. ............................ 700/245; 700/51; 700/56; 700/61; 700/200; 700/203; 318/563; 318/568.11; 318/568.19; 901/15; 73/862.331; 73/862.334; 73/862.335; 73/862.326; 73/862.328

(58) Field of Classification Search .................... 700/51, 700/56, 61, 200, 203, 245, 251, 262, 263; 318/563, 568.11, 568.19; 73/862.334, 862.331, 73/862.335, 862.326, 862.328, 862.336; 901/15; 364/167.01, 474.36, 513
See application file for complete search history.

(56) References Cited

U.S. PATENT DOCUMENTS

| | | | | |
|---|---|---|---|---|
| 4,937,759 A | * | 6/1990 | Vold ............................ | 700/262 |
| 4,975,856 A | * | 12/1990 | Vold et al. .................... | 700/263 |
| 5,911,924 A | * | 6/1999 | Siegrist et al. ............. | 264/40.1 |
| 6,851,324 B2 | * | 2/2005 | Islam et al. ............ | 73/862.328 |
| 6,851,325 B2 | * | 2/2005 | Mir et al. ................ | 73/862.335 |
| 2004/0112146 A1 | * | 6/2004 | Islam et al. ............. | 73/862.331 |
| 2004/0112147 A1 | * | 6/2004 | Mir et al. ................ | 73/862.331 |
| 2005/0039548 A1 | * | 2/2005 | Islam et al. ............. | 73/862.334 |

FOREIGN PATENT DOCUMENTS

| | | |
|---|---|---|
| JP | 6-270079 A | 9/1994 |
| JP | 7-246580 A | 9/1995 |
| JP | 10-329063 A | 12/1998 |

OTHER PUBLICATIONS

Japanese Office Action dated Mar. 4, 2008.

* cited by examiner

*Primary Examiner*—Khoi H. Tran
*Assistant Examiner*—McDieunel Marc
(74) *Attorney, Agent, or Firm*—Sughrue Mion, PLLC

(57) ABSTRACT

A robot control apparatus capable of largely reducing a calculation amount to be capable of lowering a load of a CPU is provided. A control apparatus of a robot includes: a plurality of shafts interfering with each other; each of the shafts including a motor (8), (18), an arm (9), (19) coupled to the motor (8), (18) via a spring element such as a speed reducer and a motor position detector (10), (20) for detecting a position of the motor (8), (18); a position control unit (1), (11) and a speed control unit (2), (12) in order to operate each of the shafts in correspondence with an instruction for each of the plural shafts; an interference force calculating unit (7), (17) for calculating interference force which is exerted to another shaft from an instruction of the own shaft; a non-interference torque signal forming unit (6), (16) for forming a motor torque instruction signal by which the own shaft is operated in correspondence with the instruction also in such a case that interference force exerted from another shaft is present based upon the calculation value of the interference force exerted from another shaft, and the instruction of the own shaft; and a non-interference position signal producing unit (5), (15) for producing a motor position signal by which the own shaft is operated in correspondence with the instruction also in such a case that interference force executed from another shaft is present based upon the calculation value of the interference force exerted from another shaft, and the instruction of the own shaft.

3 Claims, 5 Drawing Sheets

—PRIOR ART—

---PRIOR ART---

CONTROL APPARATUS OF ROBOT

TECHNICAL FIELD

The present invention relates to a control apparatus of a robot, which controls the robot constituted by a plurality of shafts interfering with each other in such a manner that even when interference force is exerted, the respective shafts can be operated in correspondence with instructions.

RELATED ART

A conventional robot control apparatus is provided with a model controller. The model controller contains a pseudo model, a control unit for controlling the pseudo model, and a correction amount calculating unit for calculating model compensating torque in order to cancel interference torque. The conventional robot control apparatus performs an interference free operation by outputting a model feed forward instruction to which the model compensating torque is added (refer to, for example, patent publication 1).

FIG. 5 is a control block diagram for indicating an arrangement of a conventional robot control apparatus according to an embodiment mode, which is disclosed in the patent publication 1. FIG. 6 is a control block for representing an arrangement of a model controller of FIG. 5. In FIG. 6, symbols "54U" and "54L" indicate correction amount calculating units, and symbols "60U" and "60L" represent output signals to feedback control systems. In FIG. 5, a basic construction of robot control systems of two shafts which are approximated to 2 inertia systems (spring+arm such as motor+speed reducer etc.) with respect to each of these shafts. In FIG. 5 and FIG. 6, it is so assumed that two shafts are assumed as "L shaft" and "U shaft", as to an instruction and an amount related to the L shaft, symbol "_L" is added to a suffix thereof, whereas as to an instruction and an amount related to the U shaft, symbol "_U" is added to a suffix thereof.

This robot control apparatus performs a control operation as to the L shaft and the U shaft based upon motor position instructions "$X_{ref\_L}$" and "$X_{ref\_U}$" with respect to each of the shafts. The robot control apparatus has been provided with feedback control systems (feedback controllers) 53L, 53U of the two shafts; and a model controller 51 corresponding to a pseudomodel with respect to a control subject (motors, speed reducers, and robot arms). While the model controller 51 inputs the motor position instructions "$X_{ref\_L}$" and "$X_{ref\_U}$", this model controller 51 calculates feedforward instructions "$U_{FF\_L}$" and "$U_{FF\_U}$" of the respect shafts by considering dynamics of a robot so as to execute a feedforward compensating operation with respect to an acceleration term of the motor of each of the shafts. Further, the model controller 51 calculates motor positions "$\theta_{Mm\_L}$" and "$\theta_{Mm\_U}$" of each of the shafts in a standard model; calculates motor speeds thereof:

$$\dot{\theta}_{Mm\_L}, \dot{\theta}_{Mm\_U} \qquad \text{[Formula 1]}$$

and calculates torsion angles thereof "$\theta_{MS\_L}$" and "$\theta_{MS\_U}$"; and further calculates torsion angular velocities thereof:

$$\dot{\theta}_{Ms\_L}, \dot{\theta}_{Ms\_U} \qquad \text{[Formula 2]}$$

and then outputs the calculated results.

It should be understood that a prefix "model" is added to each of elements corresponding to outputs of the model controller 51.

On the other hand, in the feedback control systems (feedback controllers) 53L and 53U, positional gains of the respective shafts are "$K_{P\_L}$" and "$K_{P\_L}$"; speed gains thereof are "$K_{U\_L}$" and "$K_{V\_U}$"; torque constants thereof are "$K_{t\_L}$" and "$K_{t\_V}$"; and final acceleration instructions applied to the motors are "$U_{ref\_L}$" and "$U_{ref\_U}$", respectively. Further, inertia moment of the motors of the respective shafts is "$J_{m\_L}$" and "$J_{m\_U}$"; and current instructions thereof are "$I_{ref\_L}$" and "$I_{ref\_U}$". Actual positions of the motors are "$\theta_{m\_L}$" and "$\theta_{m\_U}$"; actual speeds of the motors are:

$$\dot{\theta}_{m\_L}, \dot{\theta}_{m\_U} \qquad \text{[Formula 3]}$$

and also, actual acceleration of the motors are:

$$\ddot{\theta}_{m\_L}, \ddot{\theta}_{m\_U} \qquad \text{[Formula 4]}$$

In addition, speed reducing ratios in the speed reducers are expressed as "$N\_L$" and "$N\_v$"; spring constants of the speed reducers are expressed as "$K_{c\_L}$" and "$K_{c\_U}$"; inertia moment of the arms are expressed as "$J_{L\_L}$" and "$J_{L\_U}$"; actual positions of the arms are expressed as "$\theta_{L\_L}$" and "$\theta_{L\_U}$"; and acceleration (load acceleration) of the arms are represented by the following formula 5:

$$\ddot{\theta}_{L\_L}, \ddot{\theta}_{L\_U} \qquad \text{[Formula 5]}$$

Then, in order to represent interference between both the shafts, a value of $M_{LU}/M_O^2$ which determined by the mass of the robot arms and the angle between both the shafts is multiplied by load torque of the L shaft, so that the multiplied value is exerted to the load acceleration of the U shaft. Similarly, a value of $M_{UL}/M_O^2$ is multiplied by the load torque of the U shaft, so that the multiplied value is exerted to the load acceleration of the L shaft.

In this robot control system, status monitoring devices 52L and 52U have been provided with respect to the L shaft and the U shaft. The status monitoring devices 52L and 52U input the final acceleration instructions $U_{ref\_L}$ and $U_{ref\_U}$ applied to the motors, and the actual positions $\theta_{m\_L}$ and $\theta_{m\_U}$ of the motors so as to predict actual torsion angles $\theta_{s\_L}$ and $\theta_{s\_U}$, and angular velocities thereof:

$$\dot{\theta}_{s\_L}, \dot{\theta}_{s\_U} \qquad \text{[Formula 6]}$$

Then, in this feedback controller, the positional gains $K_{p\_L}$ and $k_{p\_U}$ are multiplied with respect to deviation between the model motor positions $\theta_{Mm\_L}$ and $\theta_{Mm\_U}$ outputted from the model controller 51, and the actual motor positions $\theta_{m\_L}$ and $\theta_{m\_U}$, and then, the multiplied position gains are employed as speed instructions of the respective shafts.

Further, the below-mentioned deviation is added to each of the speed instructions obtained in the above-explained manner, and then, the velocity gains $K_{V\_L}$ and $K_{V\_U}$ are multiplied with aspect to the added speed instructions, which are used as acceleration instructions. The above-described deviation is defined between the model motor speeds:

$$\dot{\theta}_{Mm\_L}, \dot{\theta}_{Mm\_U} \qquad \text{[Formula 7]}$$

and the actual motor speeds:

$$\dot{\theta}_{m\_L}, \dot{\theta}_{m\_U} \qquad \text{[Formula 8]}$$

With respect to these acceleration instructions, such values obtained by multiplying the following deviation by feedback gains $K_{1\_L}$ and $K_{1\_U}$ are added, and further such values obtained by multiplying the below-mentioned deviation by feedback gains $K_{2\_L}$ and $K_{2\_U}$ are added. Then, the resultant values are defined as the final motor acceleration instructions $U_{ref\_L}$ and $U_{ref\_U}$ with respect to the respective shafts. In this case, the first-mentioned deviation is defined by (a) the feed forward instructions $U_{FF\_L}$ and $U_{FF\_U}$ derived from the model controller 51, (b) the model torsion angles $\theta_{Ms\_L}$ and $\theta_{Ms\_U}$, and the torsion angles $\theta_{s\_L}$ and $\theta_{s\_U}$, outputted from the status monitoring devices 52L and 52U. The last-mentioned deviation is defined by (c) the model torsion angular velocities:

$$\theta_{Ms\_L}, \theta_{Ms\_U} \quad [\text{Formula 9}]$$

and the torsion angular velocities outputted from the status monitoring devices 52L and 52U:

$$\theta_{s\_L}, \theta_{s\_U} \quad [\text{Formula 10}]$$

In this robot control system, the motors of the respective shafts are driven based upon the final motor acceleration instructions $U_{ref\_L}$ and $U_{ref\_U}$ obtained in the above-explained manner, and thus, the arms of the respective shafts are driven via the speed reducers, the speed reducing ratios of which are $N_{\_L}$ and $N_{\_U}$ respectively. In this case, as previously explained, interference force between the shafts is exerted to the load acceleration of such of the shafts.

Next, a description is made of an arrangement of the model controller 51. FIG. 6 represents the detailed arrangement of the model controller 51 which is arranged by feedback control systems, motors, speed reducers, and pseudomodels indicative of robot arms. Positional gains and speed gains of the respective shafts in a pseudomodel are model positional gains "$K_{pM\_L}$" and "$K_{pM\_U}$"; and model speed gains "$K_{vM\_L}$" and "$K_{vM\_U}$", respectively. Similarly, model motor inertia moment "$J_{mM\_L}$" and "$J_{mM\_U}$", model arm inertia moment "$J_{LM\_L}$" and "$J_{LM\_U}$", model speed reducing ratios "$N_{M\_L}$" and "$N_{M\_U}$", and model speed reducer spring constants "$K_{cM\_L}$" and "$K_{cM\_U}$" have been determined as model parameters.

The model controller 51 inputs the motor position instructions $X_{ref\_L}$ and $X_{ref\_U}$ of the respective shafts, and multiplies such a deviation between the motor position instructions $X_{ref\_L}$ and $X_{ref\_U}$, and the model motor positions $\theta_{mM\_L}$ and $\theta_{mM\_U}$ by the model position gains $K_{pM\_L}$ and $K_{pM\_U}$ so as to define the multiplied values as model speed instructions of the respective shafts. Then, the model controller 51 multiplies such values by the model speed gains $K_{vM\_L}$ and $K_{pM\_U}$, and defines the multiplied values as model acceleration instructions of the respective shafts. The above-explained values are calculated by subtracting model motor speeds of the respective shafts from these model speed instructions, while these model motor speeds are expressed by the following formula:

$$\theta_{Mm\_L}, \theta_{Mm\_U} \quad [\text{Formula 11}]$$

The model controller 51 subtracts the above-described model acceleration instructions from both a value which is obtained by multiplying the model torsion angles $\theta_{MS\_L}$ and $\theta_{MS\_U}$ derived from the model speed reducer by the model feedback gains $K_{1M\_L}$ and $K_{1M\_U}$, and another value which is obtained by multiplying model torsion angular velocities by the model feedback gains $K_{2M\_L}$ and $K_{2M\_U}$. The above-explained model torsion angular velocities are obtained by differentiating the model torsion angles $\theta_{MS\_L}$ and $\theta_{MS\_U}$, and are expressed by the following formula:

$$\theta_{Ms\_L}, \theta_{Ms\_U} \quad [\text{Formula 12}]$$

The model controller 51 defines the subtracted values as model acceleration instructions "$U_{Mref\_L}$" and "$U_{Mref\_U}$", which are inputted to the model motors.

As a consequence, the model acceleration instructions $U_{Mref\_L}$ and $U_{Mref\_U}$ may be expressed by the below-mentioned formulae:

[Formula 13]

$$U_{\text{Mref\_L}} = K_{\text{pM\_L}} \cdot K_{\text{vM\_L}}(X_{\text{ref\_L}} - \theta_{\text{Mm\_L}}) - \quad (1)$$
$$K_{\text{vM\_L}} \cdot \dot{\theta}_{\text{Mm\_L}} - K_{\text{1M\_L}} \cdot \theta_{\text{Ms\_L}} - K_{\text{2M\_L}} \cdot \dot{\theta}_{\text{Ms\_L}}$$

$$U_{\text{Mref\_U}} = K_{\text{pM\_U}} \cdot K_{\text{vM\_U}}(X_{\text{ref\_U}} - \theta_{\text{Mm\_U}}) - \quad (2)$$
$$K_{\text{vM\_U}} \cdot \dot{\theta}_{\text{Mm\_U}} - K_{\text{1M\_U}} \cdot \theta_{\text{Ms\_U}} - K_{\text{2M\_U}} \cdot \dot{\theta}_{\text{Ms\_U}}$$

However, in the two shafts robot predicted in this example, due to interference, the load torque of the L shaft is multiplied by such a value of "$M_{LUM}/M_{OM}^2$", and then, the multiplied load torque is exerted to the load acceleration of the U shaft. This value is determined by the mass of the robot arms and the angle between both the L shaft and the U shafts. Similarly, the load torque of the U shaft is multiplied by another value of "$M_{LUM}/M_{OM}^2$", and then, the multiplied load torque is exerted to the load acceleration of the L shaft.

Assuming now that such an interference is grasped as disturbance which is exerted to an arm side, as to the L shaft, if model correction torque "$T_{comp\_L}$" shown in the below-mentioned formula (14) is added to the model motor acceleration instruction "$U_{Mref\_L}$", then vibrations of the arm caused by the interference can be reduced:

[Formula 14]

$$T_{\text{comp\_L}} = -\frac{K_{\text{pM\_L}} \cdot K_{\text{vM\_L}} \cdot N_{\text{M\_L}} \cdot D_{\text{is\_UL}}}{K_{\text{cM\_L}}} - \frac{K_{\text{vM\_L}} \cdot N_{\text{M\_L}} \cdot \dot{D}_{\text{is\_UL}}}{K_{\text{cM\_L}}} - \quad (3)$$
$$\frac{K_{\text{1M\_L}} \cdot D_{\text{is\_UL}}}{K_{\text{cM\_L}}} - \frac{K_{\text{2M\_L}} \cdot \dot{D}_{\text{is\_UL}}}{K_{\text{cM\_L}}} - \frac{D_{\text{is\_UL}}}{J_{\text{mM\_L}} \cdot N_{\text{M\_L}}} - \frac{N_{\text{M\_L}} \cdot \ddot{D}_{\text{is\_UL}}}{K_{\text{cM\_L}}}$$

In this formula, symbol "$D_{is\_UL}$" indicates such an interference torque which is exerted from the U shaft to the L shaft, and this interference torque may be expressed by the following formula:

[Formula 15]

$$D_{\text{is\_UL}} = J_{\text{LM\_L}} \cdot K_{\text{cM\_U}} \cdot \frac{M_{ULM}}{M_{oM}^2} \cdot \theta_{\text{Ms\_U}} \quad (4)$$

As a consequence, while a final model motor acceleration instruction "$U_{FF\_L}$" is calculated as $$U_{FF\_L} = U_{Mref\_L} + T_{comp\_L} \quad (5),$$

a feed forward compensating operation is carried out with respect to an acceleration term of a motor. This model controller 51 has been provided with the correction amount calculating unit 54L which inputs the model torsion angle "$\theta_{MS\_U}$" and calculates the model correction torque "$T_{comp\_L}$" based upon the above-explained formulae (3) and (4). Thus, the model correction torque "$T_{comp\_L}$" derived from the correction amount calculating unit 54L is added to the model motor acceleration instruction $U_{Mref\_L}$.

Similarly, as to the U shaft, model correction torque "$T_{comp\_L}$" is defined as the following formula:

[Formula 16]

$$T_{comp\_U} = -\frac{K_{pM\_U} \cdot K_{vM\_U} \cdot N_{M\_U} \cdot D_{is\_LU}}{K_{cM\_U}} - \frac{K_{vM\_U} \cdot N_{M\_U} \cdot \dot{D}_{is\_LU}}{K_{cM\_U}} - \frac{K_{1M\_U} \cdot D_{is\_LU}}{K_{cM\_U}} - \frac{K_{2M\_U} \cdot \dot{D}_{is\_LU}}{K_{cM\_U}} - \frac{D_{is\_LU}}{J_{mM\_U} \cdot N_{M\_U}} - \frac{N_{M\_U} \cdot \dot{D}_{is\_LU}}{K_{cM\_U}} \quad (6)$$

In this formula, symbol "$D_{is\_LU}$" shows interference torque which is exerted from the L shaft to the U shaft, and is expressed by the following formula:

[Formula 17]

$$D_{is\_LU} = J_{LM\_U} \cdot K_{cM\_L} \cdot \frac{M_{LUM}}{M_{oM}^2} \cdot \theta_{Ms\_L} \quad (7)$$

The model controller 51 has been provided with the correction amount calculating unit 54U which inputs the model torsion angle "$\theta_{MS\_L}$" and calculates the model correction torque "$T_{comp\_U}$" based upon the formulae (6) and (7). As a result, a final model motor acceleration instruction "$U_{FF\_U}$" becomes:

$$U_{FF\_U} = U_{Mref\_U} + T_{comp\_U} \quad (8)$$

As previously described, in the conventional technique disclosed in the patent publication 1, after the interference torque is corrected by the model controller 51 in the above-explained manner, the respective status mounts which constitute the standard status amounts are entered as the instructions to the feedback control systems. As a result, the respective robot arms are not adversely influenced by the interference caused by another shaft.

As previously described, in the conventional robot control apparatus, the interference force received from another shaft is corrected by the model controller, and then, based upon the corrected interference, the respective status amounts which become the standard status amounts are inputted to the feedback controller. As a result, the noise component is not superimposed on the corrected torque, and the robot arm can improve the locus precision of the tool tip portions without receiving of vibrations caused by the interference.

Patent Publication 1: JP-A-10-329063 (FIGS. 1 and 2, pages 2 to 5).

DISCLOSURE OF THE INVENTION

Problem that the Invention is to Solve

However, in the conventional robot control apparatus, in order to realize this controller, the model controller 51 must perform the calculation of the pseudomodel such as the calculation of the torsion angles for every control period other than the calculations of the feedback control unit. Therefore, the conventional robot control apparatus owns such a problem that a total amount of these calculations with respect to each of the shafts becomes very large.

Further, the model controller 51 must execute the calculation of the model-purpose feedback control operations so as to control the pseudomodels for every control period other than the calculation of the feedback control unit. As a result, there is another problem that a total amount of these calculations with respect to each of the shafts is further increased.

Further, since the interference free operation is carried out only by correcting the torque, the values as to the model position gain "$K_{pM}$" and the model speed gain "$K_{vM}$" are required in order to calculate the model correction torque $T_{comp}$. As a result, there is another problem that the calculation becomes more complex.

As a result, the calculation amounts for each of these shafts become huge, and the control operation time is prolonged, so that there is such a problem that a high speed CPU is required so as to realize this robot control apparatus.

The present invention has been made to solve these problems, and therefore, has an object to provide such a control apparatus of a robot which is constituted by a plurality of shafts interfering with each other. In the robot control apparatus which is equipped with a position control unit and a speed control unit in order to operate each of the shafts in correspondence with an instruction for each of the plural shafts, while each of the shafts is constituted by an arm coupled to a motor via a spring element (spring constant) such as a speed reducer, and a motor position detector for detecting a position of the motor, such a robot control apparatus can be provided: The motor can be operated in such a manner that the own shaft is operated in correspondence with the instruction also in such a case that interference force exerted from another shaft is present; the robot arm can be operated without receiving adverse influences by interference; and a calculation amount is largely reduced, so that the load given to the CPU can be reduced.

Further, another object of the present invention is to provide a robot control apparatus operable as follows: That is, also in such a case that interference force is exerted from the plural shafts to the own shaft, the process operation for calculating a total value of the interference force exerted from the respective shafts to the own shaft is merely carried out, while a relationship among the plural shafts need not be considered but also a complex calculation is not carried out. Subsequently, the interference free operations among the plural shafts can be simply carried out by merely performing a process operation similar to the inference free operation between the two shafts.

Further, in the case that interference between shafts which have not been considered is added, while a program is not substantially amended, the interference free operations for all of the shafts can be simply realized by merely adding such an operation for calculating a total value of the interference force exerted from the respective shafts.

Means for Solving the Invention

To solve the above-explained problems, according to a first aspect of the present invention, there is provided a control apparatus of a robot including:

a plurality of shafts interfering with each other;

each of the shafts including a motor, an arm coupled to the motor via a spring element such as a speed reducer and a motor position detector for detecting a position of the motor;

a position control unit and a speed control unit in order to operate each of the shafts in correspondence with an instruction for each of the plural shafts;

an interference force calculating unit for calculating interference force which is exerted to another shaft from an instruction of the own shaft;

a non-interference torque signal forming unit for forming a motor torque instruction signal by which the own shaft is operated in correspondence with the instruction also in such a case that interference force exerted from another shaft is present based upon the calculation value of the interference force exerted from another shaft, and the instruction of the own shaft; and a non-interference position signal producing unit for producing a motor position signal by which the own shaft is operated in correspondence with the instruction also in such a case that interference force executed from another shaft is present based upon the calculation value of the interference force exerted from another shaft, and the instruction of the own shaft.

In accordance with the first aspect, while the robot control apparatus contains the interference force calculating unit, the non-interference torque signal producing unit, and the non-interference position signal producing unit, this robot control apparatus does not calculate a pseudomodel but also not calculate a control for the pseudomodel, and furthermore, produces not only the motor torque signal but also the motor position signal by considering the interference. As a result, the calculation amounts can be largely lowered.

According to a second aspect of the present invention, there is provided the robot apparatus as claimed in the first aspect, wherein with respect to interference in the case that the shafts are two shafts, interference force in the interference force calculating unit is calculated based upon the below-mentioned formulae:

$$d_{is1} = B * x_{ref1} * s^2$$

$$d_{is2} = A * x_{ref2} * s^2$$

a non-interference torque signal in the non-interference torque signal producing unit is calculated based upon the below-mentioned formulae:

$$t_{\text{ref\_ff1}} = \left( \frac{J_{m1} * J_{L1} / K1 * s^4 +}{(J_{m1} + J_{L1})s^2} \right) * x_{ref1} - (J_{m1}/K1 * s^2 + 1) * d_{is2}$$

$$t_{\text{ref\_ff2}} = \left( \frac{J_{m2} * J_{L2} / K2 * s^4 +}{(J_{m2} + J_{L2})s^2} \right) * x_{ref2} - (J_{m2}/K2 * s^2 + 1) * d_{is1}; \text{ and}$$

the non-interference position signal in the non-interference position signal producing unit is calculated based upon the below-mentioned formulae:

$$x_{ref\_ff1} = (J_{L1}/K1 * s^2 + 1) * x_{ref1} - 1/K1 * d_{is2}$$

$$x_{ref\_ff2} = (J_{L2}/K2 * s^2 + 1) * x_{ref2} - 1/K2 * d_{is1}$$

in the above-explained formulae, the respective symbols are defined as follows:

$J_{m1}$: first shaft motor inertia moment
$J_{L1}$: first shaft arm inertia moment
$K1$: spring constant of first shaft speed reducer
$J_{m2}$: second shaft motor inertia moment
$J_{L2}$: second shaft arm inertia moment
$K_2$: spring constant of second shaft speed reducer
$A(=B)$: coefficients calculated based upon, structures of two shafts, angle between two shafts, and geometrical relationship between two shafts
s: Laplace operator
$d_{is}$: interference force exerted from first shaft to second shaft
$d_{is2}$: interference force exerted from second shaft to first shaft
$x_{ref1}$: first shaft position instruction
$x_{ref2}$: second shaft position instruction.

In the second aspect, the formulae for calculating the interference force, the non-interference torque signal, and the non-interference position signal can be specified.

Further, according to a third aspect of the present invention, there is provided the robot control apparatus as in the first aspect, wherein in the case that the shafts exceed two shafts, the calculation value of the interference force exerted from another shaft, which is used in the process operations by the non-interference torque signal producing unit and the non-interference position signal producing unit, is equal to a summation of interference force calculation values which are exerted from the respective shafts to the own shaft.

In the third aspect, in such a case that interference force is exerted among a plurality of shafts, the interference force is received from the plural shafts even with respect to the own shaft. In this case, since a summation of the interference force between the two shafts is calculated, the interference force exerted to the own shaft can be calculated.

Advantage of the Invention

In accordance with the first aspect of the present invention, the motor can be operated in such a manner that the own shaft is operated in correspondence with the instruction also in such a case that the interference force exerted from another shaft is present. As a result, the robot arm can be operated in correspondence with the instruction without receiving the adverse influence by the interference. Further, the calculation capable of realizing the interference free operation can be considerably reduced. Accordingly, the calculation amount of the CPU can be largely reduced, so that the low cost CPU can be employed.

Further, in accordance with the second aspect, since the formulae for calculating the interference force, the non-interference torque signal, and the non-interference position signal are specified, the robot control operation can be embodied.

Further, in accordance with the third aspect, also in such a case that interference force is exerted from the plural shafts to the own shaft, the process operation for calculating a total value of the interference force exerted from the respective shafts to the own shaft is merely carried out, while a relationship among the plural shafts need not be considered but also a complex calculation is not carried out. Subsequently, the interference free operations among the plural shafts can be simply carried out by merely performing a process operation similar to the inference free operation between the two shafts.

Further, in the case that interference between shafts which have not been considered is added, while a program is not substantially amended, the interference free operations for all of the shafts can be simply realized by merely adding such an operation for calculating a total value of the interference force exerted from the respective shafts.

Figure 1:
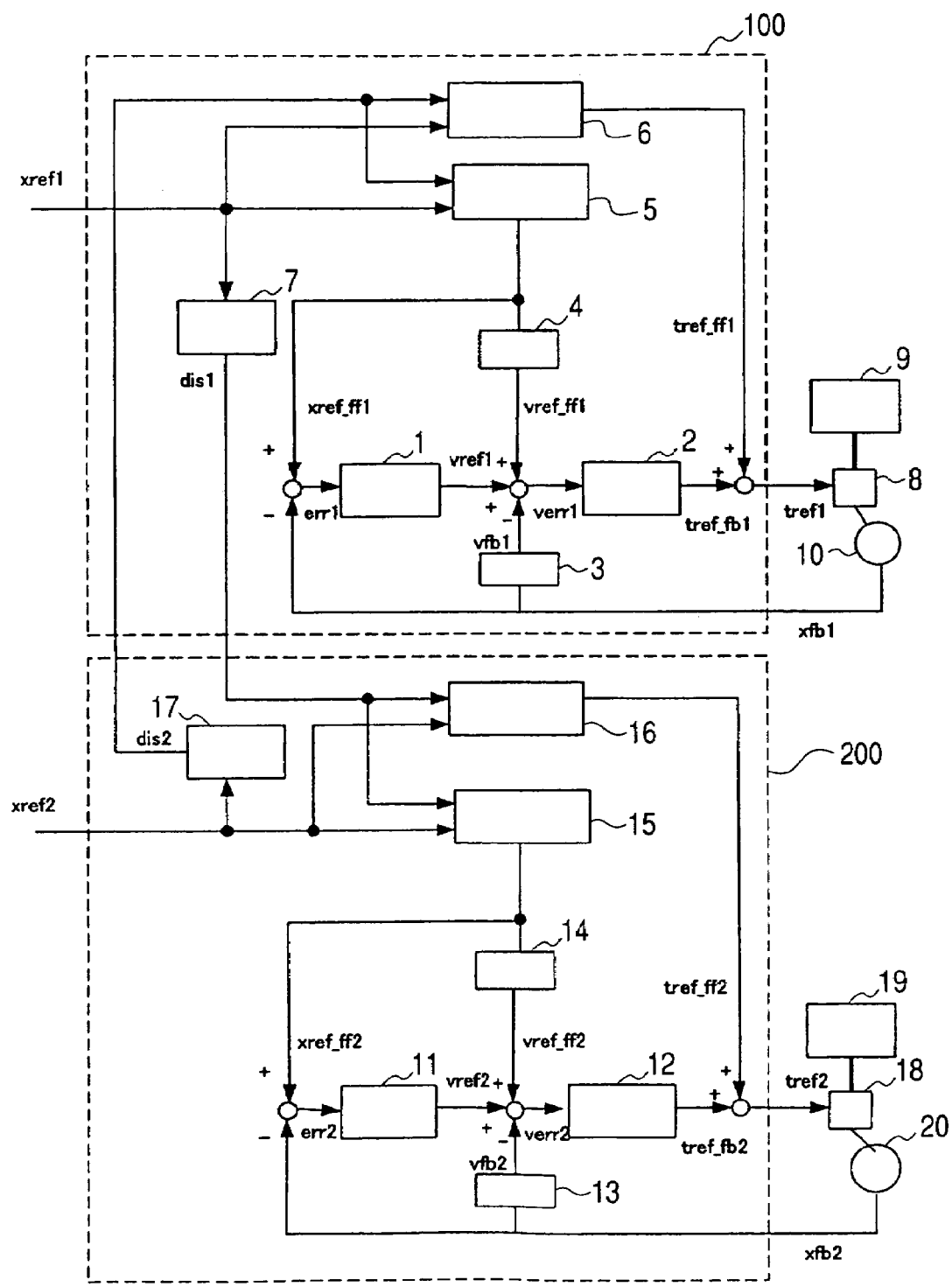
FIG. 1 is a block diagram for indicating an arrangement of a first embodiment of the present invention.

DESCRIPTION OF REFERENCE NUMERALS AND SINGS 1 position control unit
2 speed control unit
3 differentiator
4 differentiator
5 non-interference positional signal producing unit
6 non-interference torque signal producing unit
7 interference force calculating unit
8 motor
9 arm
10 position detector
11 position control unit
12 speed control unit
13 differentiator
14 differentiator
15 non-interference positional signal producing unit
16 non-interference torque signal producing unit
17 interference force calculating unit
18 motor
19 arm
20 position detector
38 motor
39 arm
30 position detector
51 model controller
52L, 52U status monitoring device
53L, 53U feedback control system (feedback controller)
54L, 54U correction amount calculating unit
60L, 60U output signal which is outputted to feedback control system
100 control apparatus of first shaft robot
200 control apparatus of second shaft robot
300 control apparatus of n-th shaft robot
500 interference force adder

BEST MODE FOR CARRYING OUT THE INVENTION

Referring now to drawings, a description is made of embodiment modes of the present invention.

Embodiment 1

FIG. 1 is an entire structural diagram for explaining a robot control apparatus of the present invention. In this drawing, reference numeral 100 shows a control apparatus of a first shaft robot, and reference numeral 200 indicates a control apparatus of a second shaft robot.

The control apparatus 100 of the first shaft robot inputs a first shaft position instruction "$x_{ref1}$", a first shaft motor position detection value "$x_{fb1}$", and an interference force calculation value "$d_{is2}$" which is exerted from the first shaft to the second shaft, and performs a control calculation in such a manner that a control subject is operated in accordance with an instruction, and then, outputs a first shaft torque instruction "$t_{ref1}$." Reference numeral 8 indicates a first shaft motor, and is operated in response to the first shaft torque instruction "$t_{ref1}$" outputted from the control apparatus 100 of the fist shaft robot. Reference numeral 9 shows a first shaft arm, and the first shaft arm 9 has been coupled via a speed reducer and the like to the motor 8. Reference numeral 10 represents a first shaft motor position detector which detects a position "$x_{fb1}$" of the first shaft motor 8.

The control apparatus 200 of the second shaft robot inputs a second shaft position instruction "$x_{ref2}$", a second shaft motor position detection value "$x_{fb2}$", and an interference force calculation value "$d_{is1}$" which is exerted from the first shaft to the second shaft, and performs a control calculation in such a manner that a control subject is operated in accordance with an instruction, and then, outputs a second shaft torque instruction "$t_{ref2}$." Reference numeral 18 indicates a second shaft motor, and is operated in response to the second shaft torque instruction "$t_{ref2}$" outputted from the control apparatus 200 of the second shaft robot. Reference numeral 19 shows a second shaft arm, and the second shaft arm 19 has been coupled via a speed reducer and the like to the motor 18. Reference numeral 20 represents a second shaft motor position detector which detects a position "$x_{fb2}$" of the second shaft motor 18.

Both the first shaft and the second shaft have been omitted due to the following reasons. That is, normally, an outputted torque instruction value "$t_{ref}$" is converted into a current instruction value, and the current instruction value is amplified by a current amplifier so as to operate a motor. A response of this operation is negligibly sufficiently fast, and has no specific relationship with the present invention.

In this case, since the sped reducers which couple the motors 8 and 18 to the arm 9 and 19 own spring elements, any of control subjects of the robot control apparatus 100 and the robot control apparatus 200 may be conceived as two inertia systems in which motor inertia moment is coupled to arm inertia moment by the spring element.

Figure 4:
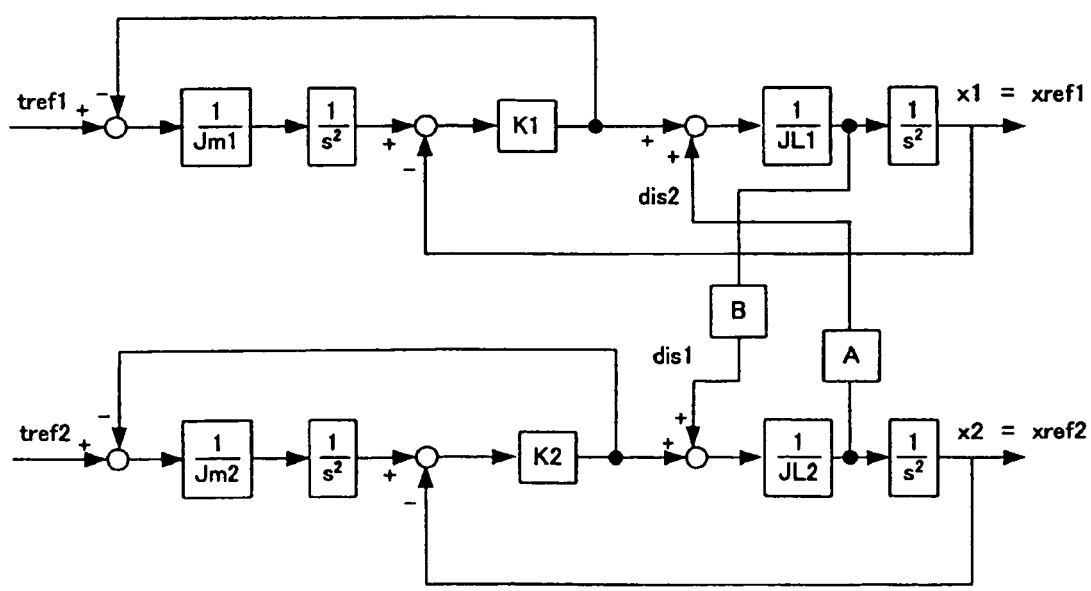
FIG. 4 indicates a control subject model in which while a mono shaft is defined as two inertia systems, mutual interference force is considered.
Figure 5:
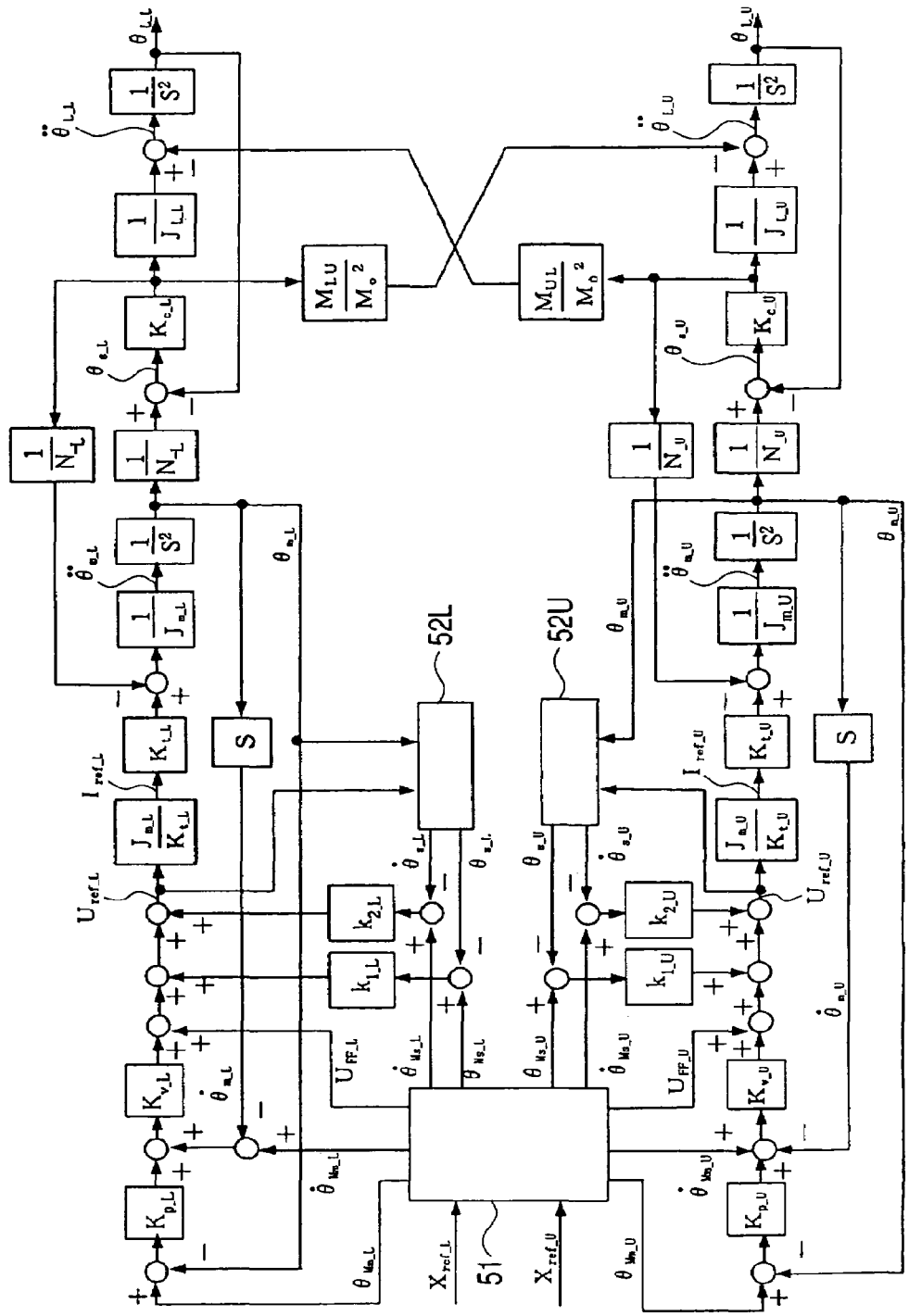
FIG. 5 is a block diagram for showing the arrangement of the conventional robot control apparatus.
Figure 6:
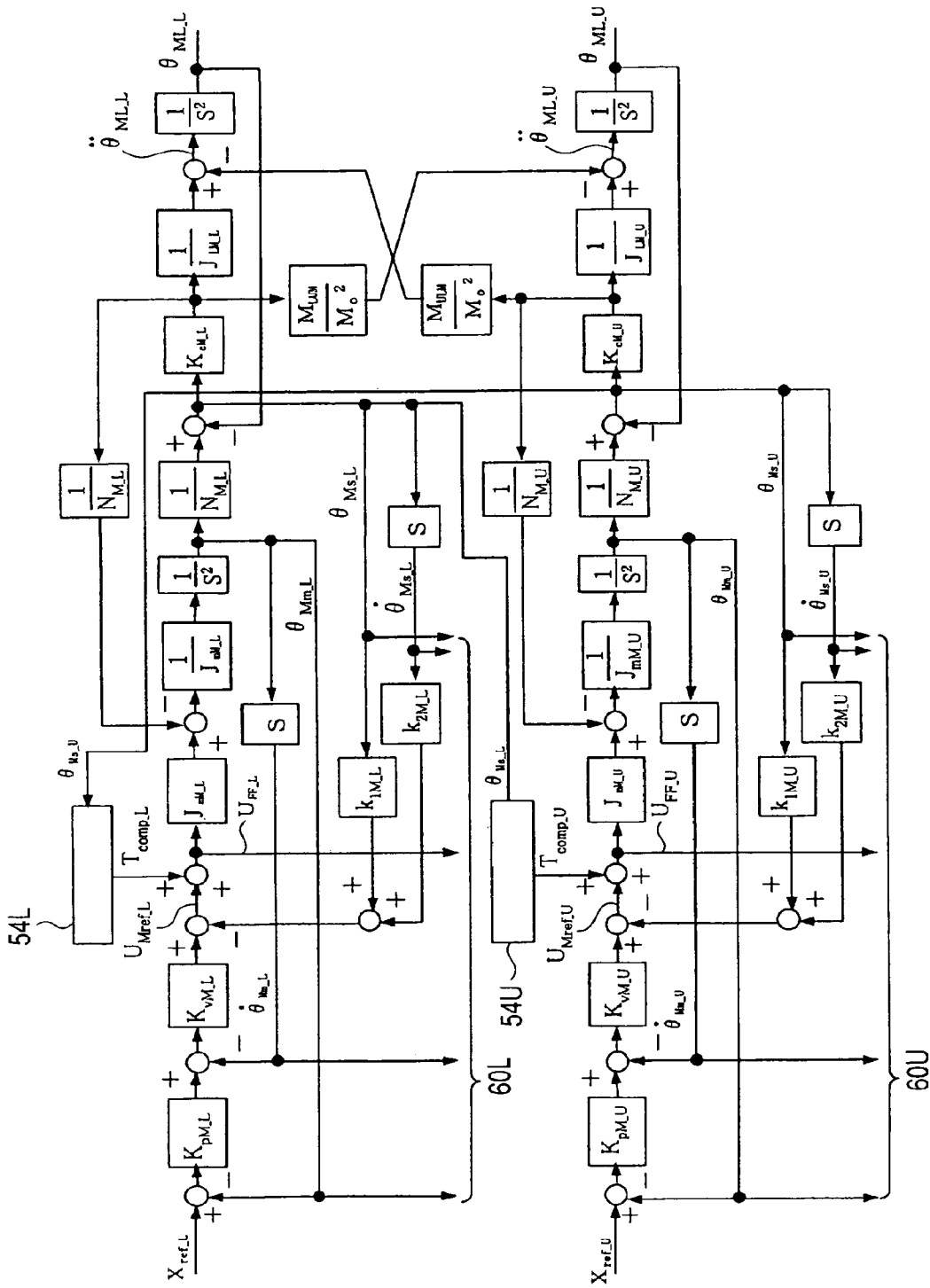
FIG. 6 is a block diagram for showing the process operations executed in the model controller of the conventional robot control apparatus.

In this embodiment, assuming now that a control subject for every single shaft is 2 inertia systems, such a structure is considered which is expressed by a transfer function shown in FIG. 4 and by considering interference occurred between the mutual shafts.

In FIG. 4, respective symbols own the below-mentioned meanings:

$J_{m1}$: first shaft motor inertia moment
$J_{L1}$: first shaft arm inertia moment
K1: spring constant of first shaft speed reducer
$J_{m2}$: second shaft motor inertia moment
$J_{L2}$: second shaft arm inertia moment
K2: spring constant of second shaft speed reducer
A, B: coefficients calculated based upon, structures of two shafts, angle between two shafts, and geometrical relationship between two shafts
s: Laplace operator
$d_{is1}$: interference force exerted from first shaft to second shaft
$d_{is2}$: interference force exerted from second shaft to first shaft
x1: position of arm 1
x2: position of arm 2

Further, the above-explained coefficients "A" and "B" may be calculated based upon a dynamic calculation.

Figure 3:
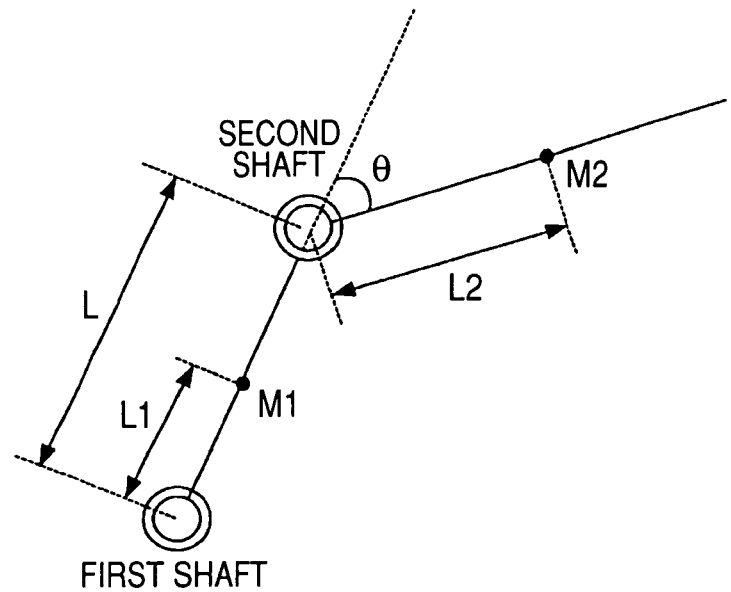
FIG. 3 represents a dynamic model used in the case that coefficients "A" and "B" required to calculate interference force calculated.

For instance, such a case that two shafts own a relationship as indicated in FIG. 3 is considered. Assuming now that an angle defined between a first shaft and a second shaft is "θ"; a distance between the first shaft and the second shaft is expressed as "L"; distances measured from a rotational center to a center of mass as to each of the first and second shafts are expressed as "L1" and "L2"; and respective mass is expressed as M1 and M2, the coefficients "A" and "B" are given by the below-mentioned formula (9):

$$A=B=M2*L2*L*\cos(\theta)+M2*L2^2 \qquad (9)$$

Next, a description is actually made of an internal arrangement of the first shaft robot control apparatus 100.

In FIG. 1, reference numeral 1 indicates a position control unit of the first shaft. The first shaft position control unit 1 inputs first shaft position deviation "err1", and performs a control calculation so as to output a first shaft speed instruction "$v_{ref1}$." The first shaft position deviation "err1" corresponds to a difference between a first shaft non-interference position signal "$x_{ref\_ff1}$" and a first shaft position detection value "$x_{fb1}$", and the first shaft position control unit 1 inputs the first shaft position deviation "err1" in such a manner that the first shaft non-interference position signal "$x_{ref\_ff1}$" is made coincident with the first shaft position detection value "$x_{fb1}$."

Although process operations of the position control unit 1 may be carried out in any manners, the position control unit 1 may execute a proportional control operation by employing a first shaft position loop proportional gain "$K_{p1}$" as indicated in, for example, formula (10):

$$v_{ref1}=K_{p1}*err1 \qquad (10)$$

Reference numeral 2 indicates a first shaft speed control unit. The first shaft speed control unit 2 inputs first shaft speed deviation "$v_{err1}$" which is calculated by the following formula (11) in such a manner that a first shaft non-interference speed signal "$v_{ref\_ff1}$" is made coincident with a first shaft speed detection value "$v_{fb1}$", and performs a control calculation operation so as to output a first shaft torque instruction value "$t_{ref\_fb1}$":

$$v_{err1}=v_{ref\_ff1}+v_{ref1}-v_{fb1} \qquad (11)$$

Although process operations in the speed control unit 2 may be carried out in any manners, the speed control unit 2 may execute a proportional integration control operation by employing a first shaft speed loop gain proportional gain "$K_{v1}$" and a first shaft speed loop integration gain "$K_{i1}$" as represented in, for instance, the below-mentioned formula (12):

$$t_{ref\_fb1}=K_{v1} \qquad (12)$$

Reference numerals 3 and 4 show differentiators.

Reference numeral 5 indicates a first shaft non-interference position signal producing unit. The first shaft non-interference position signal producing unit 5 inputs both the first shaft position instruction "$x_{ref1}$" and the interference force calculation value "$d_{is2}$" which is exerted from the second shaft to the first shaft, and produces a first shaft motor position signal by employing a relationship of the interference model of the two shafts shown in FIG. 4 so as to output this produced first shaft motor position signal as a first shaft non-interference position signal "$x_{ref\_ff1}$." The above-explained first shaft motor position signal is used in order that even when interference force "$d_{is2}$" is exerted, a tip portion "x1" of the arm 9 is operated in correspondence with the first shaft position instruction "$x_{ref1}$." A calculation formula as to the first shaft non-interference position signal "$x_{ref\_ff1}$" is expressed by the following formula (13):

$$x_{ref\_ff1}=(J_{L1}) \qquad (13)$$

Reference numeral 6 indicates a first shaft non-interference torque signal producing unit. The first shaft non-interference torque signal producing unit 6 inputs both the first shaft position instruction "$x_{ref1}$" and the interference force calculation value "$d_{is2}$" which is exerted from the second shaft to the first shaft, and produces a first shaft motor torque instruction signal by employing a relationship of the interference model of the two shafts shown in FIG. 4 so as to output this produced first shaft motor torque instruction signal as a first shaft non-interference torque signal "$t_{ref\_ff1}$." The above-explained first shaft motor torque instruction signal is used in order that even when interference force "$d_{is2}$" is exerted, the tip portion "x1" of the arm 9 is operated in correspondence with the first shaft position instruction "$x_{ref1}$." A calculation formula as to the first shaft non-interference torque signal "$t_{ref\_ff1}$" is expressed by the following formula (14):

$$t_{ref\_ff1}=(J_{L1}) \qquad (14)$$

Reference numeral 7 shows a first shaft interference force calculating unit. The first shaft interference force calculating unit 7 inputs the first shaft position instruction "$x_{ref1}$" so as to calculate interference force "$d_{is1}$" which is exerted from the first shaft to the second shaft, and then, outputs the calculated interference force "$d_{is1}$." As apparent from FIG. 4, the interference force "$d_{is1}$" is calculated based upon the below-mentioned formula (15):

$$d_{s1}=B*x_{ref1}*s^2 \qquad (15)$$

Finally, a first shaft torque instruction value "$t_{ref1}$" which is outputted from the first shaft robot control apparatus 100 to the motor 8 is calculated by the below-mentioned formula (16):

$$t_{ref1}=t_{ref\_ff1}+t_{ref\_fb1} \qquad (16)$$

Next, an internal arrangement of the second shaft robot control apparatus 200 will now be described.

In the drawing, reference numeral 11 indicates a position control unit of the second shaft. The second shaft position control unit 11 inputs second shaft position deviation "err2", and performs a control calculation so as to output a second shaft speed instruction "$v_{ref2}$." The second shaft position deviation "err2" corresponds to a difference between a second shaft non-interference position signal "$x_{ref\_ff2}$" and a second shaft position detection value "$x_{fb2}$", and the second shaft position control unit 11 inputs the second shaft position deviation "err2" in such a manner that the second shaft non-interference position signal "$x_{ref\_ff2}$" is made coincident with the second shaft position detection value "$x_{fb2}$."

Although process operations of the position control unit 11 may be carried out in any manners, the position control unit 11 may execute a proportional control operation by employing a second shaft position loop proportional gain "$K_{p2}$" as indicated in, for example, formula (17):

$$v_{ref2}=K_{p2}*err2 \qquad (17)$$

Reference numeral 12 indicates a second shaft speed control unit. The second shaft speed control unit 12 inputs second shaft speed deviation "$v_{err2}$" which is calculated by the following formula (18) in such a manner that a second shaft non-interference speed signal "$v_{ref\_ff2}$" is made coincident with a second shaft speed detection value "$v_{fb2}$", and performs a control calculation operation so as to output a second shaft torque instruction value "$t_{ref\_fb2}$":

$$v_{err2}=v_{ref\_ff2}+v_{ref2}v_{fb2} \qquad (18)$$

Although process operations in the speed control unit 12 may be carried out in any manners, the speed control unit 12 may execute a proportional integration control operation by employing a second shaft speed loop gain proportional gain "$K_{v2}$" and a second shaft speed loop integration gain "$K_{ij}$" as represented in, for instance, the below-mentioned formula (19):

$$t_{ref\_fb2} = K_{v2} * (1+K_{i2}/s) * V_{err2} \quad (19)$$

Reference numerals 13 and 14 show differentiators.

Reference numeral 15 shows a second shaft non-interference position signal producing unit. The second shaft non-interference position signal producing unit 15 inputs both the interference force calculation value "$d_{is1}$" which is exerted from the first shaft to the second shaft, and the second shaft position instruction "$x_{ref2}$", and forms a second shaft motor position signal by employing a relationship of the inference model of the two shafts shown in FIG. 4 so as to output this produced second shaft motor position signal as a second shaft non-interference position signal "$x_{ref\_ff2}$." The second shaft motor position signal is used in order that even when the interference force "$d_{is1}$" is exerted, the tip portion "x2" of the arm 19 is operated in correspondence with the second shaft position instruction "$x_{ref2}$." A calculation formula as to the second shaft non-interference position signal "$x_{ref\_ff2}$" is represented in the below-mentioned formula (20):

$$x_{ref\_ff2} = (J_{L2}/K2 * s^2 + 1) * X_{ref2} - 1/K2 * d_{is1} \quad (20)$$

Reference numeral 16 indicates a second shaft non-interference torque signal producing unit. The second shaft non-interference torque signal producing unit 16 inputs both the second shaft position instruction "$x_{ref2}$" and the interference force calculation value "$d_{is1}$" which is exerted from the first shaft to the second shaft, and produces a second shaft motor torque instruction signal by employing a relationship of the interference model of the two shafts shown in FIG. 4 so as to output this produced second shaft motor torque instruction signal as a second shaft non-interference torque signal "$t_{ref\_ff2}$." The above-explained second shaft motor torque instruction signal is used in order that even when interference force "$d_{is1}$" is exerted, the tip portion "x2" of the arm 19 is operated in correspondence with the second shaft position instruction "$x_{ref2}$." A calculation formula as to the second shaft non-interference torque signal "$t_{ref\_ff2}$" is expressed by the following formula (21):

$$t_{ref\_ff2} = (J_{m2} * J_{L2}/K2 * s^4 + \quad (21)$$

Reference numeral 17 shows a second shaft interference force calculating unit. The second shaft interference force calculating unit 17 inputs the second shaft position instruction "$x_{ref2}$" so as to calculate interference force "$d_{is2}$" which is exerted from the second shaft to the first shaft, and then, outputs the calculated interference force "$d_{is2}$." As apparent from FIG. 4, the interference force "$d_{is2}$" is calculated based upon the below-mentioned formula (22):

$$d_{is2} = A * x_{ref2} * s^2 \quad (22)$$

Finally, the second shaft torque instruction value "$t_{ref2}$" which is outputted from the second shaft robot control apparatus 200 to the motor 18 is calculated by the below-mentioned formula (23):

$$t_{ref2} = t_{ref\_ff2} + t_{ref\_fb2} \quad (23)$$

As previously explained, the robot control apparatus is arranged so as to perform the feedback control operation by producing the motor position signal and the motor torque instruction signal in such a manner that even when the interference force is exerted, the respective shaft arms 9 and 19 may be operated in correspondence with the instructions for the respective shafts, and then, the motors 8 and 18 may be operated in accordance with these instructions. As a result, even in such a case that shaft-to-shaft interference occurs, the respective shaft arms 9 and 19 can be operated in response to the instructions of the own shafts.

The present invention owns the following different portions from those of the patent publication 1. That is, the robot control apparatus of the present invention is equipped with the non-interference position signal producing unit and the non-interference torque signal producing unit, while this robot control apparatus does not contain the pseudomodel and the model-purpose controller. The different portions are featured to produce not only the motor torque correction signal, but also the motor position signal by considering the interference.

Embodiment 2

Figure 2:
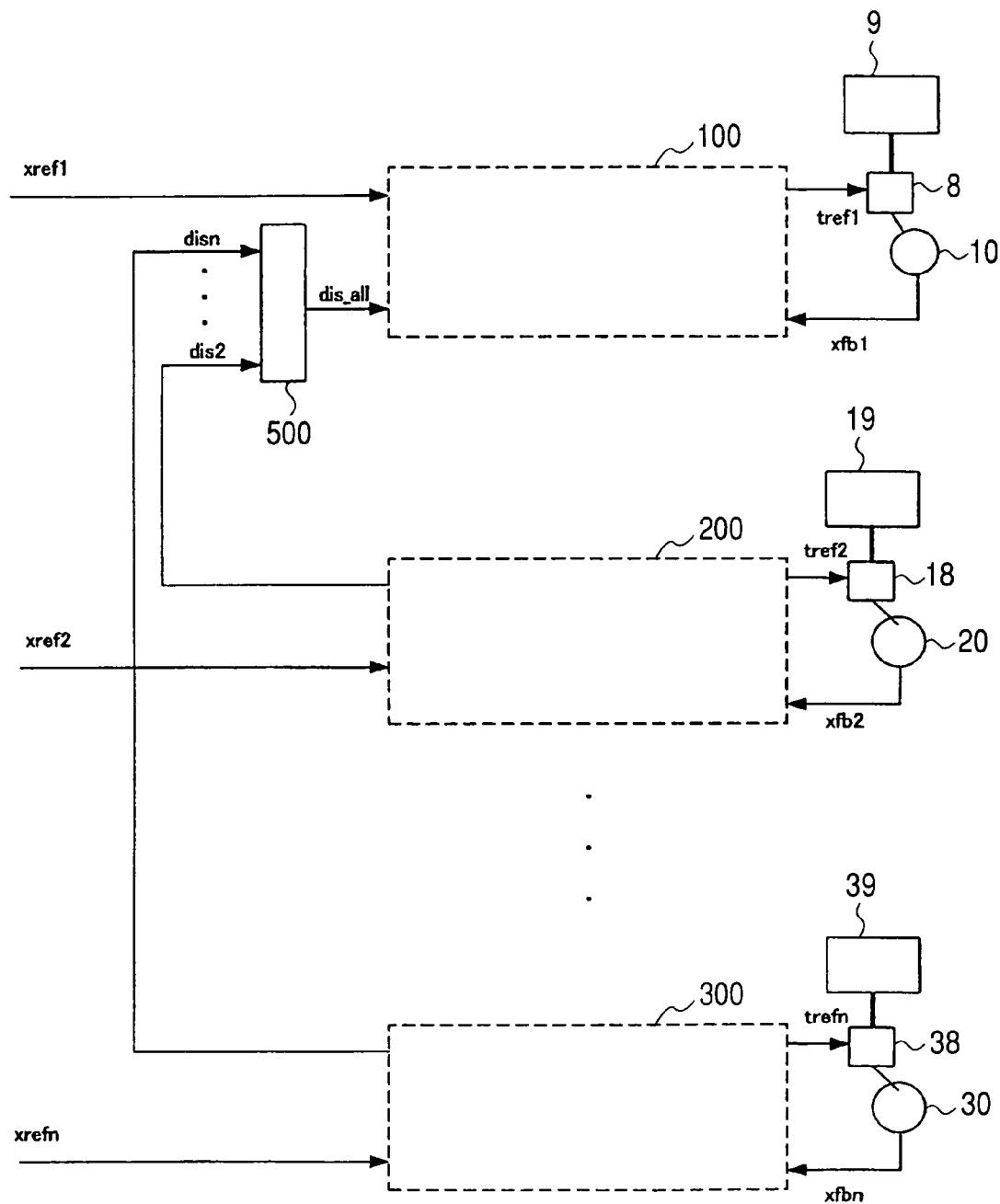
FIG. 2 is a block diagram for showing an arrangement of a second embodiment of the present invention.

FIG. 2 is a diagram for indicating an arrangement of a second embodiment. A different point of this second embodiment from that of the first embodiment is given as follows: That is, in the first embodiment, the interference of the two shafts is considered, whereas in this second embodiment, such a case that interference force is exerted among a plurality of shafts is considered.

As indicated in FIG. 2, a robot which is constituted by "n" pieces of shafts will now be considered. In this case, an interference free operation of a first shaft in the case that interference is exerted to the first shaft from a second shaft through an "n"-th shaft respectively is exemplified. A completely similar interference free operation may be realized as to also interference among other shafts.

In this drawing, reference numeral 38 indicates an n-th shaft motor which is operated in response to an n-th shaft torque instruction "$t_{refn}$" which is outputted from a control apparatus 300 of an "n"-th shaft robot. Reference numeral 39 indicates an "n"-th shaft arm which has been coupled via a speed reducer and the like to a motor 38. Reference numeral 30 indicates a "n"-th shaft motor position detector which detects a position "$x_{fbn}$" of the n-th shaft motor 38.

Reference numeral 500 shows an interference force adder. The interference force adder 500 executes such a process operation as represented in the below-mentioned formula (24), while this interference force adder 500 calculates a summation "$d_{is\_all}$" by adding plural interference force calculation values from an interference force calculation value "$d_{i2}$" which is exerted from the second shaft to the first shaft up to an interference force calculation value "$d_{isn}$" which is exerted from the "n"-th shaft to the first shaft:

$$d_{is\_all} = d_{is2} + d_{is3} + \cdots + d_{isn} \quad (24)$$

In this formula, similar to the calculation explained by employing FIG. 3 in the embodiment 1, the interference force calculation values from "$d_{is2}$" to "$d_{isn}$" are obtained based upon the structures of the respective shafts from the first shaft up to the n-th shaft, angles among the shafts, and a geometrical relationship among the shafts.

As previously explained, even in such a case that the interference is exerted among the plural shafts, while the summation value of the interference force calculation values is inputted which are exerted from the respective shafts to the own shaft, a similar process operation to that of the first embodiment is merely carried out. As a result, the interference free operations among all of the shafts can be carried out by a simple arrangement and by reducing a calculation amount.

Further, in the case that shafts are increased, and such an interference which has not been considered is newly considered, while all of the process operations for the respective shafts are not completely changed, a portion for calculating a summation of interference force calculation values among the respective shafts may be merely added and merely corrected. As a result, the above-explained cases can be simply accepted.

INDUSTRIAL APPLICABILITY

The present invention can be utilized in control apparatus of robots with employment of a low-cost CPU, and also in interference free control operations for robots having a large number of shafts, since the calculation amount is small and the interference free operations of the robots can be realized even when the interference force is exerted among the plural shafts.

The invention claimed is:

1. A control apparatus of a robot comprising:
   a plurality of shafts interfering with each other;
   each of the shafts including a motor, an arm coupled to the motor via a spring element such that a speed reducer and a motor position detector for detecting a position of the motor;
   a position control unit and a speed control unit in order to operate each of the shafts in correspondence with an instruction for each of the plural shafts;
   an interference force calculating unit for calculating interference force which is exerted to another shaft from an instruction of an own shaft;
   a non-interference torque signal forming unit for forming a motor torque instruction signal by which the own shaft is operated in correspondence with the instruction also in such a case that interference force exerted from another shaft is present based upon the calculation value of the interference force exerted from another shaft, and the instruction of the own shaft; and
   a non-interference position signal producing unit for producing a motor position signal by which the own shaft is operated in correspondence with the instruction also in such a case that interference force executed from another shaft is present based upon the calculation value of the interference force exerted from another shaft, and the instruction of the own shaft.

2. The robot control apparatus as claimed in claim 1, wherein
   with respect to interference in the case that the shafts are two shafts,
   interference force in the interference force calculating unit is calculated based upon the below-mentioned formulae:

$$d_{is1} = B * x_{ref1} * s^2$$

$$d_{is2} = A * x_{ref2} * s^2$$

a non-interference torque signal in the non-interference torque signal producing unit is calculated based upon the below-mentioned formulae:

$$t_{ref\_ff1} = \left( \frac{J_{m1} * J_{L1}/K1 * s^4 +}{(J_{m1} + J_{L1})s^2} \right) * x_{ref1} - (J_{m1}/K1 * s^2 + 1) * d_{is2}$$

$$t_{ref\_ff2} = \left( \frac{J_{m2} * J_{L2}/K2 * s^4 +}{(J_{m2} + J_{L2})s^2} \right) * x_{ref2} - \left( \frac{J_{m2}}{K2} * s^2 + 1 \right) * d_{is1}; \text{ and}$$

the non-interference position signal in the non-interference position signal producing unit is calculated based upon the below-mentioned formulae:

$$x_{ref\_ff1} = (J_{L1}/K1 * s^2 + 1) * x_{ref1} - 1/K1 * d_{is2}$$

$$x_{ref\_ff2} = (J_{L2}/K2 * s^2 + 1) * x_{ref2} - 1/K2 * d_{is1};$$

in the above-explained formulae, the respective symbols are defined as follows:
   $J_{m1}$: first shaft motor inertia moment
   $J_{L1}$: first shaft arm inertia moment
   K1: spring constant of first shaft speed reducer
   $J_{m2}$: second shaft motor inertia moment
   $J_{L2}$: second shaft arm inertia moment
   K2: spring constant of second shaft speed reducer
   A(=B): coefficients calculated based upon, structures of two shafts, angle between two shafts, and geometrical relationship between two shafts
   s: Laplace operator
   $d_{is1}$: interference force exerted from first shaft to second shaft
   $d_{is2}$: interference force exerted from second shaft to first shaft
   $x_{ref1}$: first shaft position instruction
   $x_{ref2}$: second shaft position instruction.

3. The robot control apparatus as claimed in claim 1, wherein
   in the case that the shafts exceed two shafts, the calculation value of the interference force exerted from another shaft, which is used in the process operations by the non-interference torque signal producing unit and the non-interference position signal producing unit, is equal to a summation of interference force calculation values which are exerted from the respective shafts to the own shaft.

* * * * *